US010601295B2

(12) United States Patent
Tsai et al.

(10) Patent No.: US 10,601,295 B2
(45) Date of Patent: Mar. 24, 2020

(54) MOVING-MAGNET TRANSFER PLATFORM

(71) Applicant: DELTA ELECTRONICS, INC., Taoyuan (TW)

(72) Inventors: Ching-Hsiung Tsai, Taoyuan (TW); Chi-Wen Chung, Taoyuan (TW); Chieh-Huang Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 288 days.

(21) Appl. No.: 15/709,702

(22) Filed: Sep. 20, 2017

(65) Prior Publication Data
US 2018/0254691 A1 Sep. 6, 2018

(30) Foreign Application Priority Data

Mar. 1, 2017 (CN) .......................... 2017 1 0118355

(51) Int. Cl.
*H02K 41/03* (2006.01)
*H02P 25/064* (2016.01)
(Continued)

(52) U.S. Cl.
CPC .......... *H02K 41/031* (2013.01); *H02K 11/27* (2016.01); *H02K 11/33* (2016.01); *H02P 25/064* (2016.02); *H02K 11/215* (2016.01)

(58) Field of Classification Search
CPC ...... H02K 41/031; H02K 11/27; H02K 11/33; H02K 11/215; H02P 25/064; B65G 43/00;
(Continued)

(56) References Cited

U.S. PATENT DOCUMENTS 6,191,507 B1 * 2/2001 Peltier .................... B65G 54/02
310/12.02
6,326,708 B1 * 12/2001 Tsuboi .................. B60L 15/005
310/12.06
(Continued)

FOREIGN PATENT DOCUMENTS

CN 1359556 A 7/2002
CN 1961470 A 5/2007
(Continued)

*Primary Examiner* — Emily P Pham
(74) *Attorney, Agent, or Firm* — Kirton McConkie; Evan R. Witt

(57) ABSTRACT

A moving-magnet transfer platform includes a mover part, a driving part and a stator part. The mover part includes a moving table and a magnet assembly. The stator part includes plural coils, plural switch elements, a current sensor, an electric angle detector, plural magnetic field sensors and a signal processor. The plural switch elements are connected between the driving part and the corresponding coils. When the magnet assembly is moved to a position of the corresponding coil, a magnetic field change is detected by the corresponding magnetic field sensor. The signal processor is used for controlling operations of the plural switch elements. When the magnet assembly is moved to the position of the corresponding coil, the corresponding switch element is turned on under control of the signal processor, so that the moving table is moved with the magnet assembly.

20 Claims, 10 Drawing Sheets

(51) Int. Cl.
*H02K 11/27* (2016.01)
*H02K 11/33* (2016.01)
*H02K 11/215* (2016.01)

(58) Field of Classification Search
CPC ............ B65G 54/02; B65G 2203/0266; B65G 2203/043; B65G 2203/044; B65G 2811/09
See application file for complete search history.

(56) References Cited

U.S. PATENT DOCUMENTS

| | | | | |
|---|---|---|---|---|
| 6,334,523 | B1* | 1/2002 | Fukunaga | B23P 19/007 198/345.3 |
| 6,348,746 | B1* | 2/2002 | Fujisawa | H02K 41/031 310/12.21 |
| 8,397,896 | B2* | 3/2013 | Kleinikkink | B23Q 7/1447 198/345.3 |
| 9,333,875 | B2* | 5/2016 | Staunton | B60L 13/03 |
| 9,505,560 | B2* | 11/2016 | Kleinikkink | G05B 19/00 |
| 9,611,107 | B2* | 4/2017 | Wernersbach | B65G 54/02 |
| 9,633,878 | B1* | 4/2017 | Krishnan | H01L 21/67721 |
| 10,118,774 | B2* | 11/2018 | Tomoda | H02K 41/03 |
| 10,189,655 | B2* | 1/2019 | Pradelli | B65G 54/02 |
| 2002/0070099 | A1* | 6/2002 | Neely | B65G 1/0435 198/750.1 |
| 2003/0230941 | A1* | 12/2003 | Jacobs | B60L 15/38 310/12.19 |
| 2013/0038145 | A1* | 2/2013 | Fujiwara | H02K 33/16 310/20 |
| 2014/0142792 | A1* | 5/2014 | Hanaka | B61L 25/026 701/19 |
| 2018/0079605 | A1* | 3/2018 | Koga | B61B 13/00 |

FOREIGN PATENT DOCUMENTS

| | | |
|---|---|---|
| CN | 101680779 A | 3/2010 |
| CN | 101971483 A | 2/2011 |
| CN | 102804566 A | 11/2012 |
| CN | 204993012 U | 1/2016 |
| JP | H10203626 A | 8/1998 |
| JP | 2001078421 A | 3/2001 |
| JP | 2001085503 A | 3/2001 |

* cited by examiner

MOVING-MAGNET TRANSFER PLATFORM

FIELD OF THE INVENTION

The present invention relates to a transfer platform, and more particularly to a moving-magnet transfer platform.

BACKGROUND OF THE INVENTION

With increasing development of science and technology, transfer platforms are widely applied to various fields. For example, a transfer platform is equipped with a linear motor to carry and transfer objects automatically. Moreover, the conventional transfer platform further comprises a ball screw. The cooperation of the ball screw and the motor is used for controlling the moved position of the transfer platform. Nowadays, the demands on the performance of the transfer platform are gradually increased. For example, the transfer platform needs to have many benefits such as high speed, low noise and high positioning precision. For achieving these benefits, a moving-magnet transfer platform was introduced into the market. Consequently, the mechanical transfer platform including the motor and the ball screw is replaced by the moving-magnet transfer platform.

Conventionally, the moving-magnet transfer platform comprises a mover part, a stator part and a driving part. The mover part is movable relative to the stator part. The mover part comprises a coil assembly with plural coils. The stator part is fixed and immobile. The stator part comprises a magnet assembly. The driving part issues a driving power. Moreover, the driving part controls the electric power to flow through the coils according to the relative positions between the coils and the magnet assembly. In response to the electric power, the coil generates a first magnetic field. The first magnetic field and a second magnetic field of the magnetic assembly interact with each other. Consequently, the mover part is correspondingly moved.

When the electric power flows through the coils of the coil assembly, a great amount of heat is generated. Consequently, during the operation of the conventional moving-magnet transfer platform, the operating temperature is increased. For reducing the operating temperature and protecting the moving-magnet transfer platform, an additional heat dissipating mechanism is necessary. Since the coil assembly is the main component of the mover part and the mover part is continuously moved during the operation of the moving-magnet transfer platform, the positions of the plural coils are continuously changed. Under this circumstance, the moving-magnet transfer platform is complicated and the heat dissipating efficacy is impaired.

Since the coil assembly is the main component of the mover part, the coils of the coil assembly receives electric power through a power cable. Moreover, since the mover part is continuously moved during the operation of the moving-magnet transfer platform, a drag chain is used to tow and protect the power cable. The use of the drag chain increases the fabricating cost of the moving-magnet transfer platform. Moreover, due to the drag chain, the available inner space of the moving-magnet transfer platform is reduced. Since the mover part is continuously moved, the power cable connected with the plural coils is readily abraded.

As mentioned above, the magnet assembly is the main component of the stator part, and the coil assembly is the main component of the mover part. For allowing the mover part to be moved relative to the stator part in a specified range, the area of the magnet assembly must be as large as possible. Under this circumstance, the stator part needs a large number of permanent magnets to form the magnet assembly. Since the material cost of the permanent magnets is high, the fabricating cost of the conventional moving-magnet transfer platform is increased.

As mentioned above, the driving part of the conventional moving-magnet transfer platform issues the driving power. Moreover, the driving part needs to control the electric power to flow through the coils. Consequently, the circuitry of the driving part is more complicated. During the process of switching the electric power to the coils, current fluctuation possibly occurs. Due to the current fluctuation, the working status of the driving part is unstable.

Therefore, there is a need of providing an improved moving-magnet transfer platform in order to overcome the above drawbacks.

SUMMARY OF THE INVENTION

An object of the present invention provides a moving-magnet transfer platform with a simplified heat dissipating mechanism, enhanced heat dissipating efficiency, cost-effectiveness, simplified driving part and stable working status.

In accordance with an aspect of the present invention, there is provided a moving-magnet transfer platform. The moving-magnet transfer platform includes a mover part, a driving part and a stator part. The mover part includes a first moving table and a first magnet assembly. The first magnet assembly is disposed on the first moving table. The driving part generates a driving power. The stator part is arranged beside the mover part. The stator part includes a coil assembly, plural first switch elements, a current sensor, an electric angle detector, a first magnetic field sensor assembly and a signal processor. The coil assembly includes plural coils, which are arranged side by side. The plural first switch elements are connected between the driving part and the corresponding coils. The current sensor is used for detecting a driving current of the driving power and generating a current detection signal. The electric angle detector is used for detecting an electric angle of the driving current according to the current detection signal and generating a corresponding electric angle signal. The first magnetic field sensor assembly includes plural first magnetic field sensors. When the first magnet assembly is moved to a position of the corresponding coil, a magnetic field change is detected by the corresponding first magnetic field sensor. The signal processor is used for controlling operations of the plural first switch elements according to the electric angle signal and sensing results of the plural first magnetic field sensors. When the first magnet assembly is moved to the position of the corresponding coil, the corresponding first switch element is turned on under control of the signal processor, and the corresponding coil receives the driving power through the corresponding first switch element, so that the first moving table is moved with the first magnet assembly.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
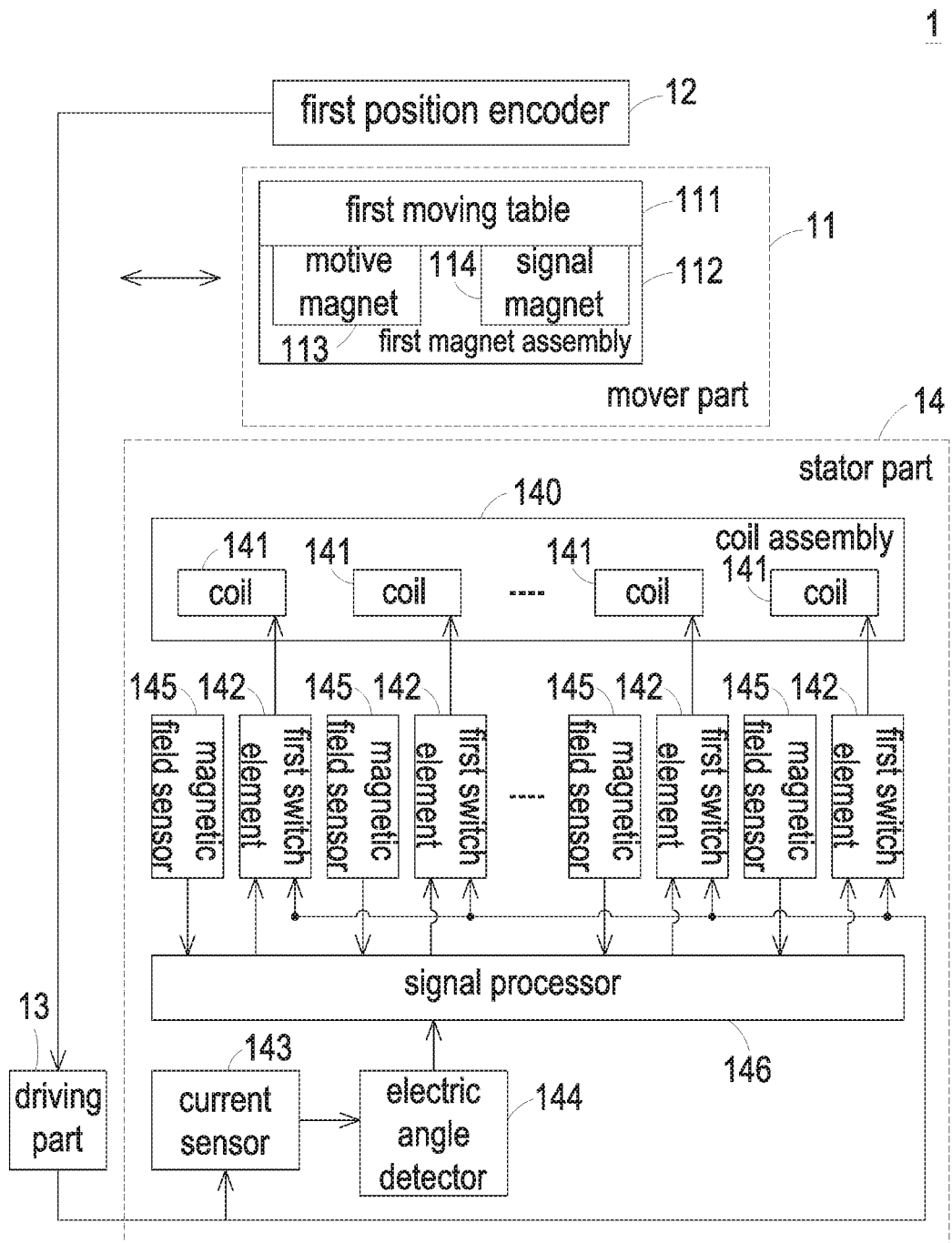
FIG. 1 is a schematic block diagram illustrating the architecture of a moving-magnet transfer platform according to a first embodiment of the present invention.
Figure 2:
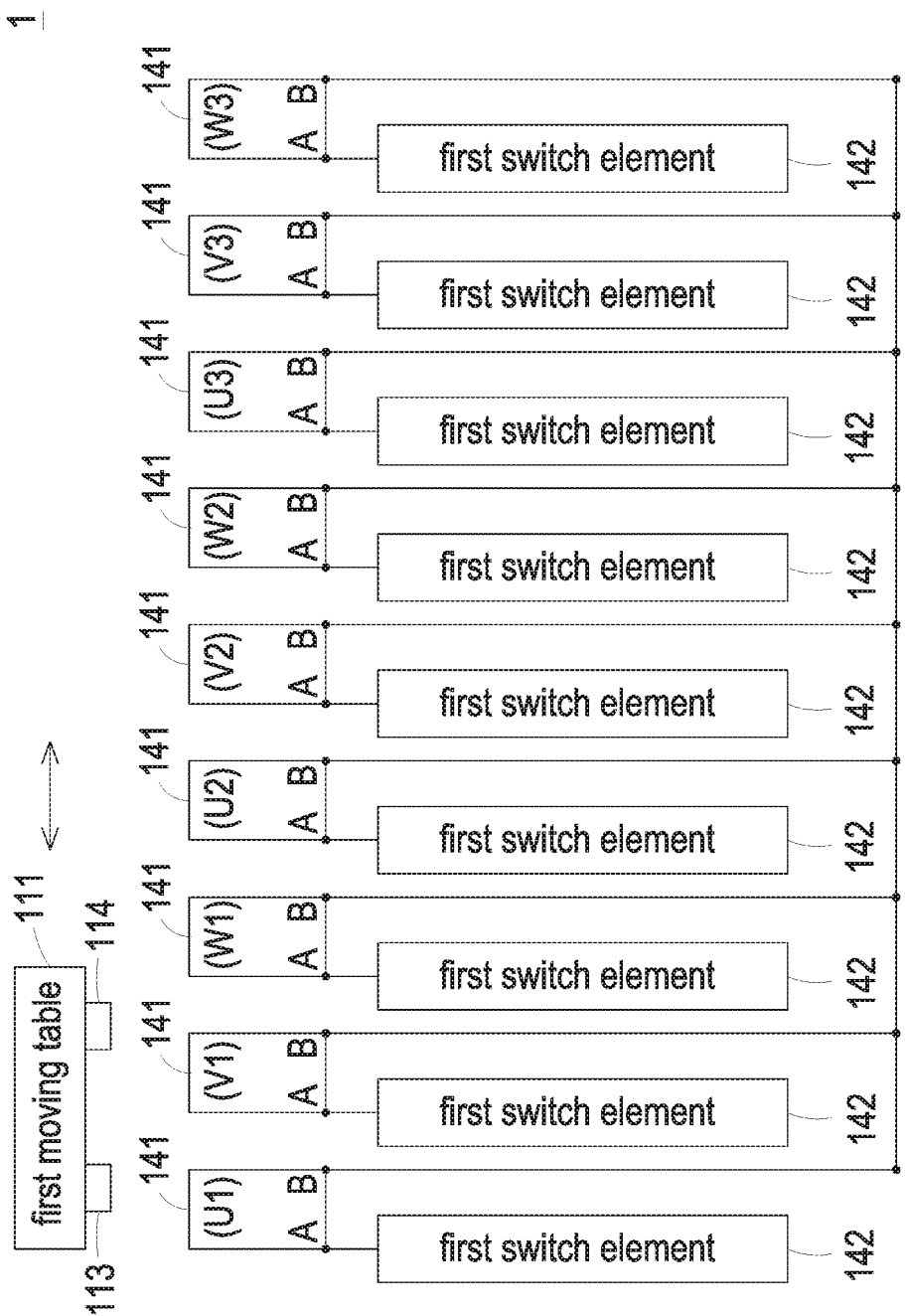
FIG. 2 is a schematic block diagram illustrating the relationships between the coils and the first switch elements of the moving-magnet transfer platform as shown in FIG. 1.
Figure 3:
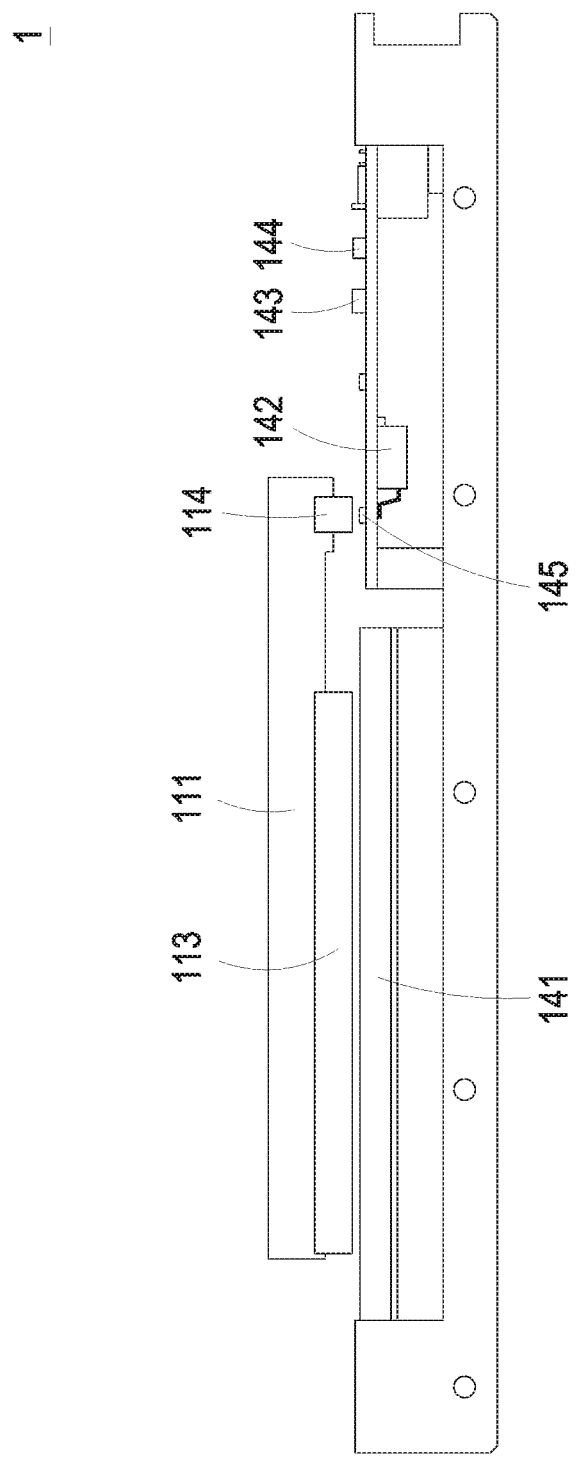
FIG. 3 is a schematic cross-sectional view illustrating a portion of the moving-magnet transfer platform as shown in FIG. 1.

FIG. 1 is a schematic block diagram illustrating the architecture of a moving-magnet transfer platform according to a first embodiment of the present invention. FIG. 2 is a schematic block diagram illustrating the relationships between the coils and the first switch elements of the moving-magnet transfer platform as shown in FIG. 1. FIG. 3 is a schematic cross-sectional view illustrating a portion of the moving-magnet transfer platform as shown in FIG. 1. An example of the moving-magnet transfer platform is a linear motor. In this embodiment, the moving-magnet transfer platform 1 comprises a mover part 11, a driving part 13 and a stator part 14. The mover part 11 is disposed over the stator part 14 and movable relative to the stator part 14. The mover part 11 comprises at least one moving table and at least one magnet assembly. In this embodiment, the mover part 11 comprises a first moving table 111 and a first magnet assembly 112. The first moving table 111 is moved over the stator part 14 in a reciprocating manner along the direction indicated by a double headed arrow (see FIG. 1). The first magnet assembly 112 is disposed on a bottom surface of the first moving table 111. Due to the magnetic interaction between the first magnet assembly 112 and the stator part 14, the first moving table 111 is moved with the first magnet assembly 112. Moreover, the first magnet assembly 112 provides the information about the position of the first moving table 111. The driving part 13 receives a DC power from a DC bus (not shown) and converts the DC power into a corresponding driving power.

The first magnet assembly 112 comprises a motive magnet 113 and a signal magnet 114, which are permanent magnets. The magnetic interaction between the motive magnet 113 and the stator part 14 results in the movement of the first moving table 111. The signal magnet 114 is used for providing the information about the position of the first moving table 111.

The stator part 14 is fixed and arranged beside the mover part 11. In this embodiment, the stator part 14 comprises a coil assembly 140, plural first switch elements 142, a current sensor 143, an electric angle detector 144, at least one magnetic field sensor assembly and a signal processor 146. Due to the magnetic interaction between the coil assembly 140 and the motive magnet 113 of the first magnet assembly 112, the motive magnet 113 is moved. Correspondingly, the first moving table 111 is moved over the stator part 14 in the reciprocating manner. The coil assembly 140 comprises plural coils 141, which are arranged side by side. In an embodiment, the plural coils 141 are enameled wires. In another embodiment, the plural coils 141 are flat coils that are formed on a printed circuit board (PCB). The arranging direction of the plural coils is in parallel with the moving direction of the mover part 11. Each first switch element 142 is connected between the driving part 13 and the corresponding coil 141. The first switch element 142 is selectively turned on or turned off. When the first switch element 142 is turned on, the first switch element 142 receives the driving power from the driving part 13. Consequently, the driving power is transmitted to the corresponding coil 141 through the first switch element 142. In response to the driving power, the coil 141 generates a magnetic field. The magnetic field generated by the coil 141 and the magnetic field generated by the motive magnet 113 interact with each other. Consequently, the first moving table 111 is correspondingly moved.

The current sensor 143 is connected with the driving part 13 for detecting a driving current of the driving power from the driving part 13. According to the detecting result, the current sensor 143 generates a current detection signal. The electric angle detector 144 is connected with the current sensor 143. According to the current detection signal, the electric angle detector 144 detects an electric angle of the driving current from the driving part 13 and generates a corresponding electric angle signal. As shown in FIG. 1, the stator part 14 comprises a single magnetic field sensor assembly. The magnetic field sensor assembly comprises plural magnetic field sensors 145. Preferably but not exclusively, the magnetic field sensors 145 are digital magnetic field sensors. When the signal magnet 114 of the first magnet assembly 112 is moved to the position of the corresponding coil 141, the magnetic field change of the coil 141 is detected by the corresponding magnetic field sensor 145. The magnetic field sensor 145 further generates a sensing result.

The signal processor 146 is connected with the plural magnetic field sensors 145, the electric angle detector 144 and the plural first switch elements 142. According to the electric angle signal from the electric angle detector 144 and the sensing results from the magnetic field sensors 145, the signal processor 146 generates a corresponding control signal. Each first switch element 142 is alternately turned on or turned off according to the control signal. When the signal magnet 114 of the first magnet assembly 112 is moved to the position of the corresponding coil 141, the corresponding first switch element 142 is turned on. Consequently, the corresponding coil 141 receives the driving power through the on-state first switch element 142. In response to the driving power, the first moving table 111 is moved with the motive magnet 113.

According to the sensing result of the at least one first magnetic field sensor 145, the signal processor 146 realizes that the signal magnet 114 is moved to the corresponding coil 141. Moreover, when the signal processor 146 realizes that the electric angle of the driving current reaches a predetermined value (e.g., 0 or 180 degree), the first switch element 142 connected with the coil 141 corresponding to the signal magnet 114 is turned on under control of the signal processor 146. Consequently, the corresponding coil 141 receives the driving power through the on-state first switch element 142. In response to the driving power, the corresponding coil 141 generates a magnetic field. The magnetic field generated by the coil 141 and the magnetic field generated by the motive magnet 113 interact with each other. Consequently, the first moving table 111 is moved with the first magnet assembly 112. In this embodiment, the uses of the current sensor 143 and the electric angle detector 144 can search the electric angle at the good timing of switching the first switch element 142. Consequently, the current fluctuation of switching the first switch element 142 is reduced.

In the moving-magnet transfer platform 1, the first magnet assembly 112 is the main component of the mover part 11, and the coil assembly 140 is the main component of the stator part 14. In accordance with the conventional technology, the mover part comprises the coil assembly and the stator part comprises the magnet assembly. Since the coil assembly 140 of the moving-magnet transfer platform 1 is fixed and immobile, the heat dissipating mechanism is simplified and the heat dissipating efficacy is enhanced.

As mentioned above, the coil assembly 140 is the main component of the stator part 14 of the moving-magnet transfer platform 1. Consequently, it is not necessary to install a drag chain to tow and protect the power cable (not shown) that is connected with the plural coils 141. Since the drag chain is omitted, the moving-magnet transfer platform 1 of the present invention is cost-effective when compared with the conventional moving-magnet transfer platform. Moreover, the available space inside the moving-magnet transfer platform 1 is increased. Since the stator part 14 is fixed and immobile, the power cable connected with the plural coils 141 is not abraded.

As mentioned above, the first magnet assembly 112 is the main component of the mover part 11 of the moving-magnet transfer platform 1, and the coil assembly 140 is the main component of the stator part 14 of the moving-magnet transfer platform 1. Consequently, the coil assembly 140 is composed of more coils 141, and the first magnet assembly 112 is composed of more permanent magnets. In such way, the mover part 11 is movable relative to the stator part 14 in a specified range. Since the material cost of the coil is much lower than the material cost of the permanent magnet, the moving-magnet transfer platform 1 is cost-effective.

Moreover, the first switch element 142 is passively turned on or turned off according to the position of the signal magnet 114. Consequently, the operations of each coil 141 of the coil assembly 140 are correspondingly controlled. Since the operations of each coil 141 are not actively controlled by the driving part 13, the circuitry of the driving part 13 is simplified. As mentioned above, the uses of the current sensor 143 and the electric angle detector 144 can search the electric angle at the good timing of switching the first switch element 142. Consequently, the current fluctuation of switching the first switch element 142 is reduced. In other words, the working status of the moving-magnet transfer platform 1 is more stable.

Please refer to FIG. 1 again. The moving-magnet transfer platform 1 further comprises a first position encoder 12. Preferably but not exclusively, the first position encoder 12 comprises an optical sensor, a magnetic sensor, a capacitive sensor or any other appropriate position sensor. The first position encoder 12 is connected with the driving part 13 and arranged beside the mover part 11. According to the position of the mover part 11, the first position encoder 12 generates a first position encoding signal to the driving part 13. In an embodiment, the first position encoder 12 and the stator part 14 are independently and separately arranged. Moreover, the motive magnet 113 and the signal magnet 114 are separated from each other. Due to the distance between the motive magnet 113 and the signal magnet 114, the magnetic fields of the motive magnet 113 and the signal magnet 114 do not interact with each other. The plural magnetic field sensors 145 are separated from each other. Moreover, every two adjacent magnetic field sensors 145 are separated from each other by a 120-degree electric angle. Moreover, the driving part 13 and the stator part 14 are independently and separately arranged.

Please refer to FIG. 2 again. The driving power from the driving part 13 is three-phase power with a U phase, a V phase and a W phase. Consequently, the number of the coil 141 is a multiple of three. That is, every three coils 141 are collaboratively defined as a three-phase coil group. As shown in FIG. 2, the coils U1, V1 and W1 are collaboratively defined as a three-phase coil group, the coils U2, V2 and W2 are collaboratively defined as a three-phase coil group, and the coils U3, V3 and W3 are collaboratively defined as a three-phase coil group. Moreover, each coil 141 comprises a first terminal A and a second terminal B. The first terminal A of each coil 141 is connected with the corresponding first switch element 142. The second terminal B of each coil 141 is connected with the second terminals B of the other coils 141.

Figure 4:
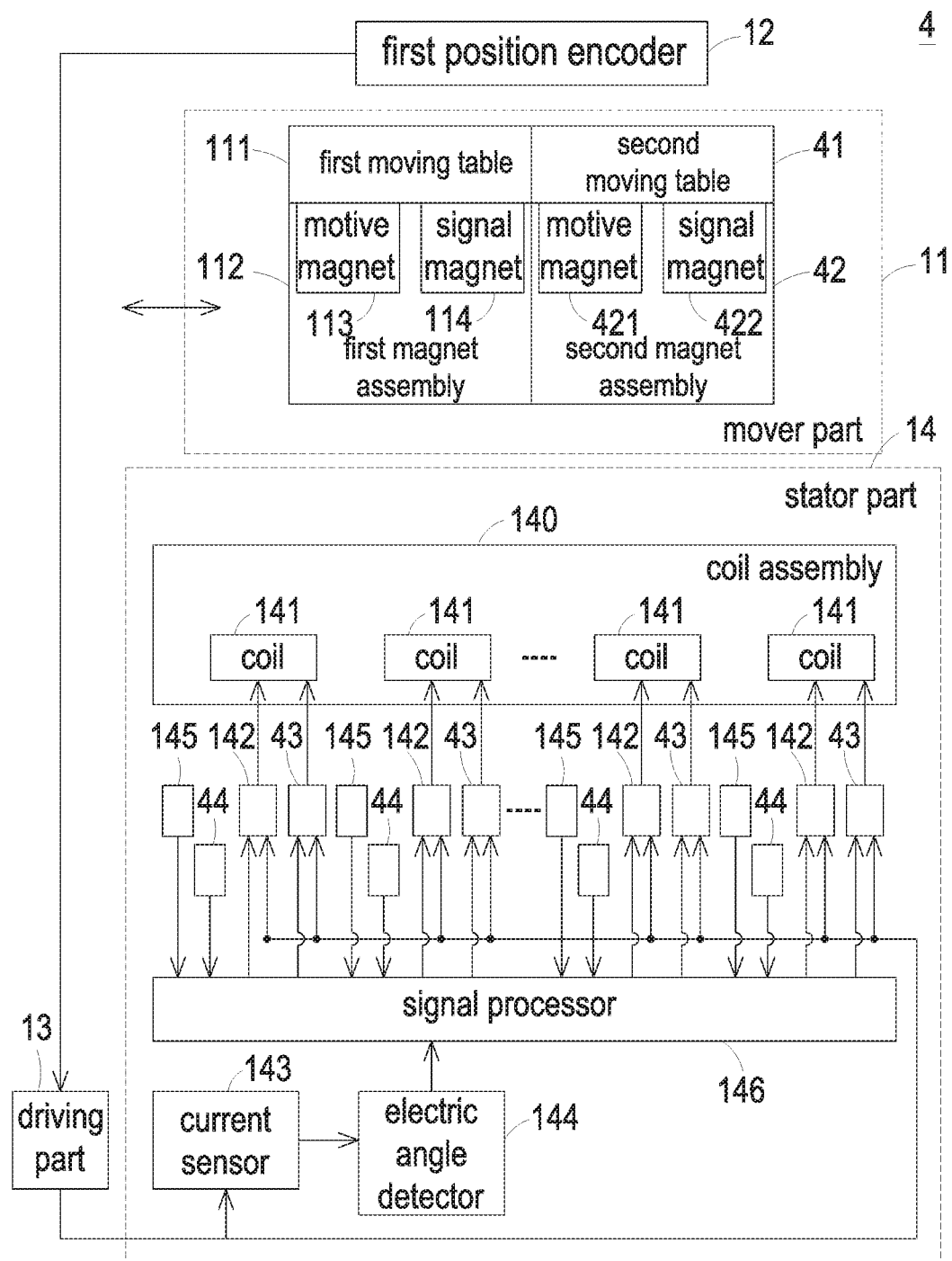
FIG. 4 is a schematic block diagram illustrating the architecture of a moving-magnet transfer platform according to a second embodiment of the present invention.

FIG. 4 is a schematic block diagram illustrating the architecture of a moving-magnet transfer platform according to a second embodiment of the present invention. In comparison with FIG. 1, the mover part 11 of the moving-magnet transfer platform 1 further comprises a second moving table 41 and a second magnet assembly 42. Moreover, the stator part 14 of the moving-magnet transfer platform 1 further comprises another magnetic field sensor assembly with plural magnetic field sensors 44. Namely, the stator part 14 of the moving-magnet transfer platform 1 comprises a first magnetic field sensor assembly with plural first magnetic field sensors 145 and a second magnetic field sensor assembly with plural second magnetic field sensors 44. The second moving table 41 is connected with the first moving table 111 in series. Moreover, the second moving table 41 is moved over the stator part 14 in a reciprocating manner. The second magnet assembly 42 is disposed on a bottom surface of the second moving table 41. Due to the magnetic interaction between the second magnet assembly 42 and the stator part 14, the second moving table 41 is moved with the second magnet assembly 42. Moreover, the second magnet assembly 42 provides the information about the position of the second moving table 41. The structure of the second magnet assembly 42 is similar to the structure of the first magnet assembly 112. The second magnet assembly 42 comprises a motive magnet 421 and a signal magnet 422. The magnetic interaction between the motive magnet 421 and the stator part 14 results in the movement of the second moving table 41. The signal magnet 422 is used for providing the information about the position of the second moving table 41. Preferably but not exclusively, the magnetic field sensors 44 of the magnetic field sensor assembly are digital magnetic field sensors. When the signal magnet 422 of the second magnet assembly 42 is moved to the position of the corresponding coil 141, the magnetic field change of the coil 141 is detected by the corresponding magnetic field sensor 44. The magnetic field sensor 44 further generates a sensing result. Each second switch element 43 is connected between the driving part 13 and the corresponding coil 141. The second switch element 43 is selectively turned on or turned off. When the second switch element 43 is turned on, the second switch element 43 receives the driving power from the driving part 13. Consequently, the driving power is transmitted to the corresponding coil 141 through the second switch element 43. In response to the driving power, the coil 141 generates a magnetic field. The magnetic field generated by the coil 141 and the magnetic field generated by the motive magnet 421 interact with each other. Consequently, the second moving table 41 is correspondingly moved.

According to the sensing result of the at least one second magnetic field sensor 44, the signal processor 146 realizes that the signal magnet 422 of the second magnet assembly 42 is moved to the corresponding coil 141. Moreover, the second switch element 43 connected with the coil 141 corresponding to the signal magnet 422 of the second magnet assembly 42 is turned on under control of the signal processor 146. Consequently, the corresponding coil 141 receives the driving power through the on-state second switch element 43. In response to the driving power, the corresponding coil 141 generates a magnetic field. The magnetic field generated by the coil 141 and the magnetic field generated by the motive magnet 421 of the second magnet assembly 42 interact with each other. Consequently, the second moving table 41 is moved with the second magnet assembly 42.

It is noted that numerous modifications and alterations may be made while retaining the teachings of the invention. For example, in another embodiment, the mover part of the moving-magnet transfer platform comprises at least three moving tables and at least three magnet assemblies. Under this circumstance, the moving-magnet transfer platform comprises at least three magnetic field sensor assemblies, plural first switch elements, plural second switch elements and plural third switch elements.

Figure 5:
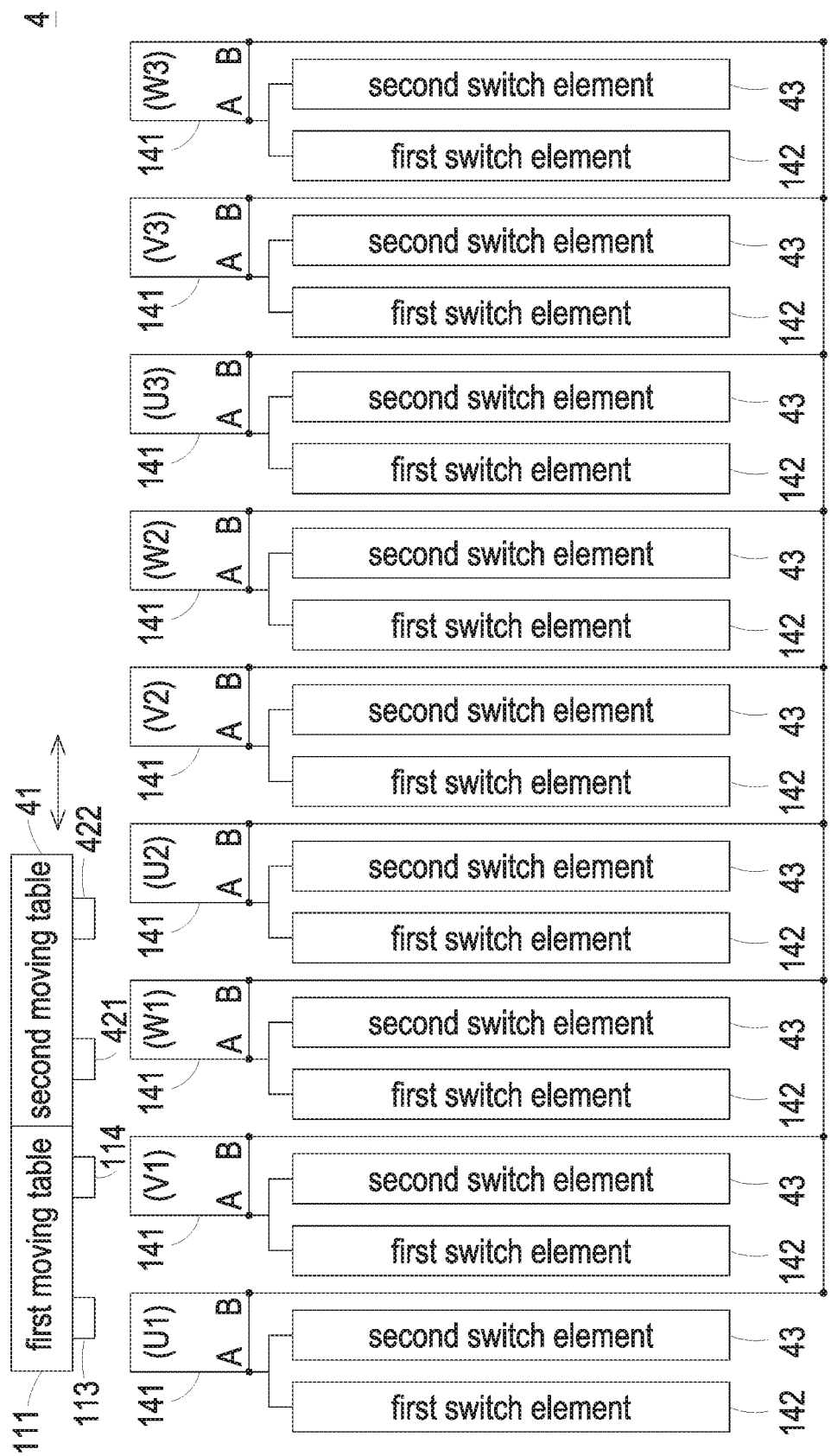
FIG. 5 is a schematic block diagram illustrating an example of the relationships between the coils, the first switch elements and the second switch elements of the moving-magnet transfer platform as shown in FIG. 4.

FIG. 5 is a schematic block diagram illustrating an example of the relationships between the coils, the first switch elements and the second switch elements of the moving-magnet transfer platform as shown in FIG. 4. As shown in FIG. 5, each coil 141 comprises a first terminal A and a second terminal B. The first terminal A of each coil 141 is connected with the corresponding first switch element 142 and the corresponding second switch element 43. That is, the first switch element 142 and the second switch element 43 connected with the first terminal A of the corresponding coil 141 are connected with each other in parallel. The second terminal B of each coil 141 is connected with the second terminals B of the other coils 141. Since the second terminals B of the plural coils 141 are connected with each other, the plural coils 141 are connected to the common neutral point. Moreover, since the way of connecting the coils 141, the first switch elements 142 and the second switch elements 43 is simplified, the circuitry of the stator part is simplified.

Figure 6:
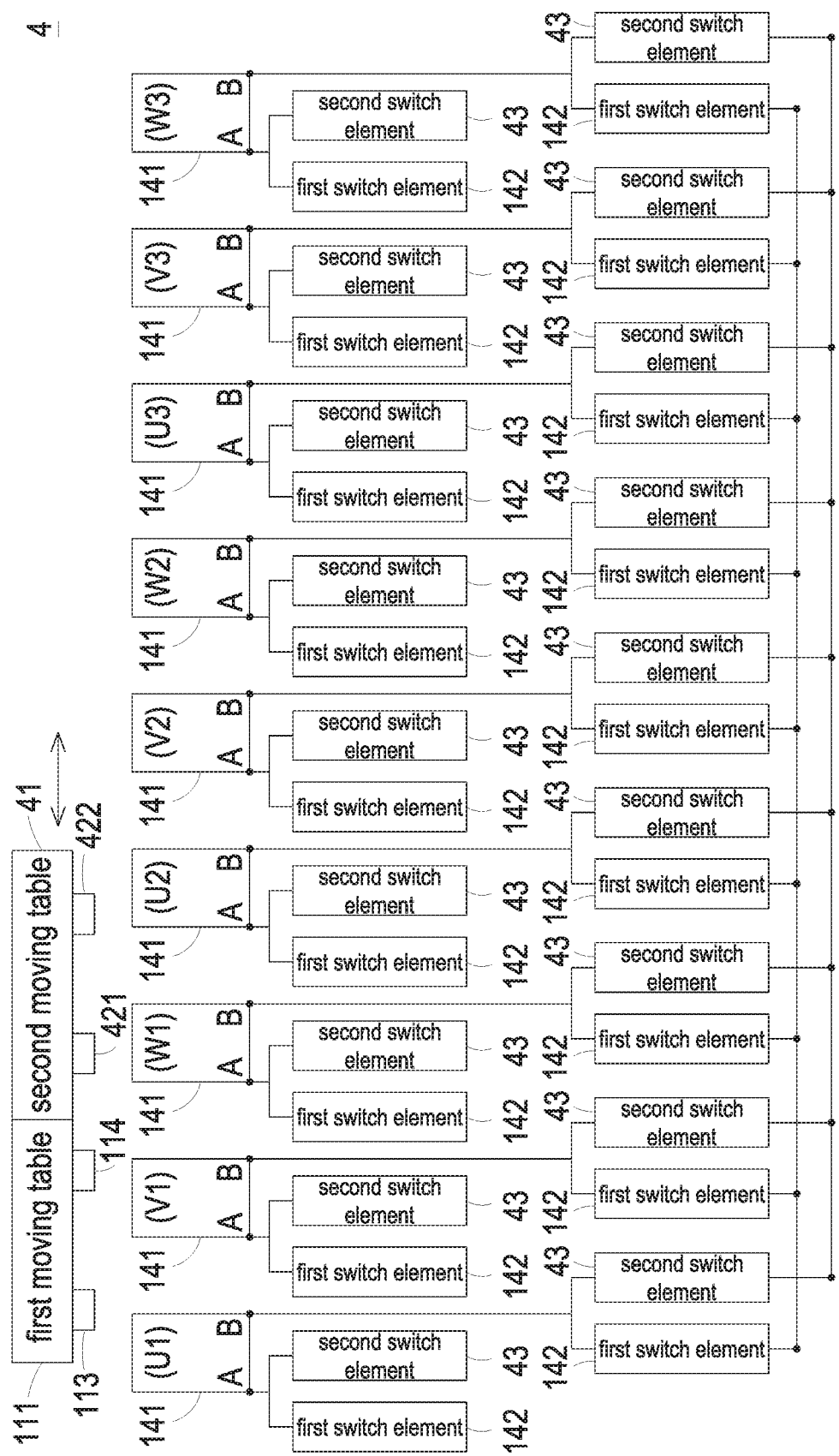
FIG. 6 is a schematic block diagram illustrating another example of the relationships between the coils, the first switch elements and the second switch elements of the moving-magnet transfer platform as shown in FIG. 4.

In case that the mover part of the moving-magnet transfer platform comprises plural moving tables and plural magnet assemblies, the moving-magnet transfer platform may comprise plural driving parts. Under this circumstance, the relationships between the coils, the first switch elements and the second switch elements are altered. FIG. 6 is a schematic block diagram illustrating another example of the relationships between the coils, the first switch elements and the second switch elements of the moving-magnet transfer platform as shown in FIG. 4. In this embodiment, the plural driving parts 13 receive the DC power from the same DC bus. The first terminal A of each coil 141 is connected with the corresponding first switch element 142 and the corresponding second switch element 43. That is, the first switch element 142 and the second switch element 43 that are connected with the first terminal A of the corresponding coil 141 are connected with each other in parallel. The second terminal B of each coil 141 is connected with the corresponding first switch element 142 and the corresponding second switch element 43. That is, the first switch element 142 and the second switch element 43 that are connected with the second terminal B of the corresponding coil 141 are connected with each other in parallel. The first switch element 142 and the second switch element 43 connected with the first terminal A of the corresponding coil 141 and the first switch element 142 and the second switch element 43 connected with the second terminal B of the corresponding coil 141 are different. Moreover, the first switch elements 142 that are connected with the second terminals B of the coils 141 are connected with each other, and the second switch elements 43 that are connected with the second terminals B of the coils 141 are connected with each other. Moreover, as shown in FIG. 6, the plural coils 141 are not connected to the common neutral point. Consequently, during the switching processes of the first switch element 142 and the second switch element 43 and during the operations of the coils 141, the interference noise is reduced.

Figure 7:
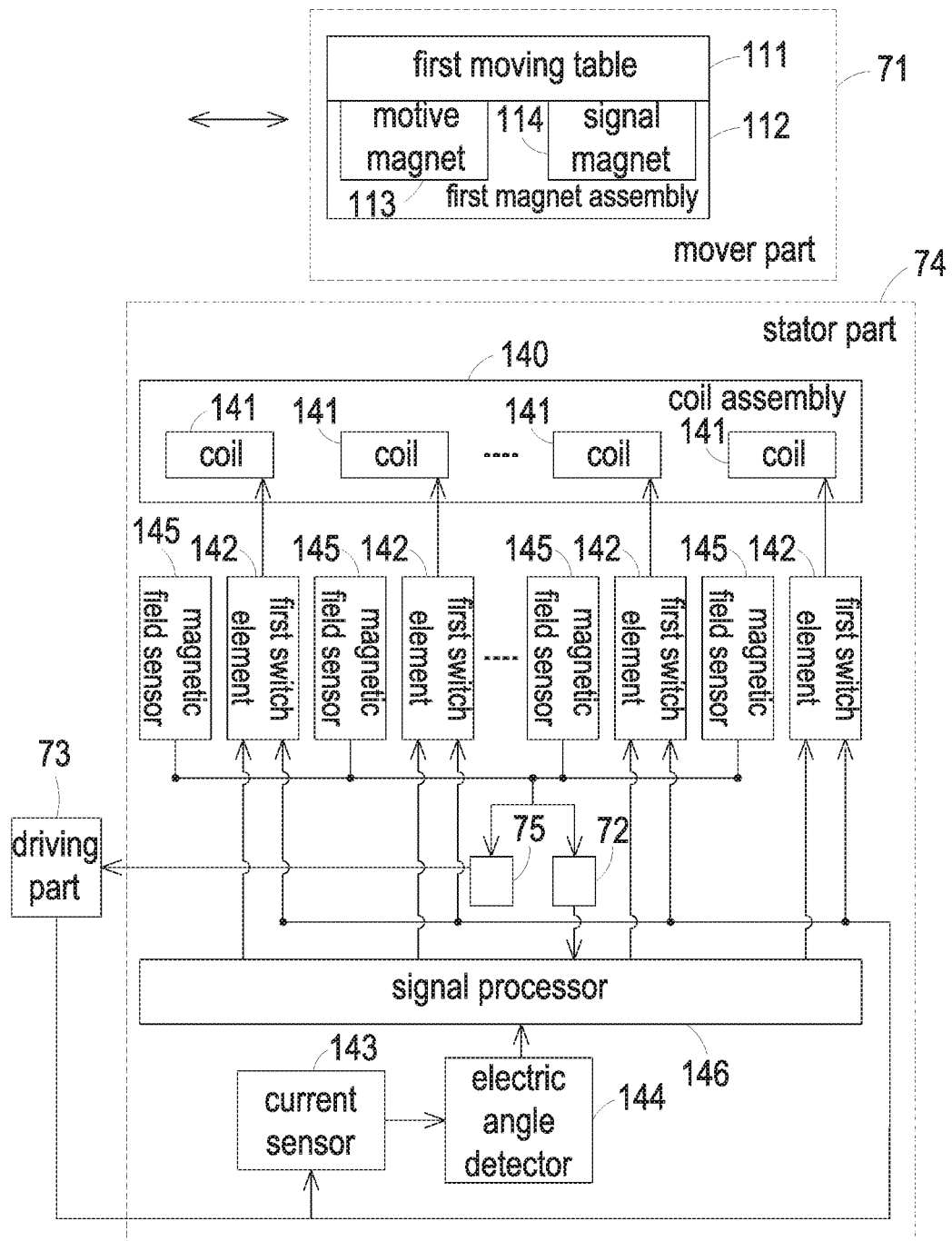
FIG. 7 is a schematic block diagram illustrating the architecture of a moving-magnet transfer platform according to a third embodiment of the present invention.

FIG. 7 is a schematic block diagram illustrating the architecture of a moving-magnet transfer platform according to a third embodiment of the present invention. As shown in FIG. 7, the moving-magnet transfer platform 7 comprises a mover part 71, a driving part 73 and a stator part 74. The structures and operations of the mover part 71 and the driving part 73 are similar to those of FIG. 1, and are not redundantly described herein. In comparison with FIG. 1, the plural first magnetic field sensors 145 of this embodiment are analog magnetic field sensors. Moreover, the stator part 74 of the moving-magnet transfer platform 7 further comprises an analog-to-digital converter 72 and a first position encoder 75. The analog-to-digital converter 72 is connected between the plural first magnetic field sensors 145 and the signal processor 146. The analog-to-digital converter 72 is used for converting the analog sensing results of the first magnetic field sensors 145 into digital sensing results and providing the digital sensing results to the signal processor 146. The first position encoder 75 is integrated into the stator part 74. Moreover, the first position encoder 75 is connected between the first magnetic field sensors 145 and the driving part 73. According to the sensing results of the first magnetic field sensors 145, the first position encoder 75 realizes the position of the mover part 71. According to the position of the mover part 71, the first position encoder 75 provides a first position encoding signal to the driving part 73. Moreover, the driving part 73 and the stator part 74 are independently and separately arranged.

Figure 8:
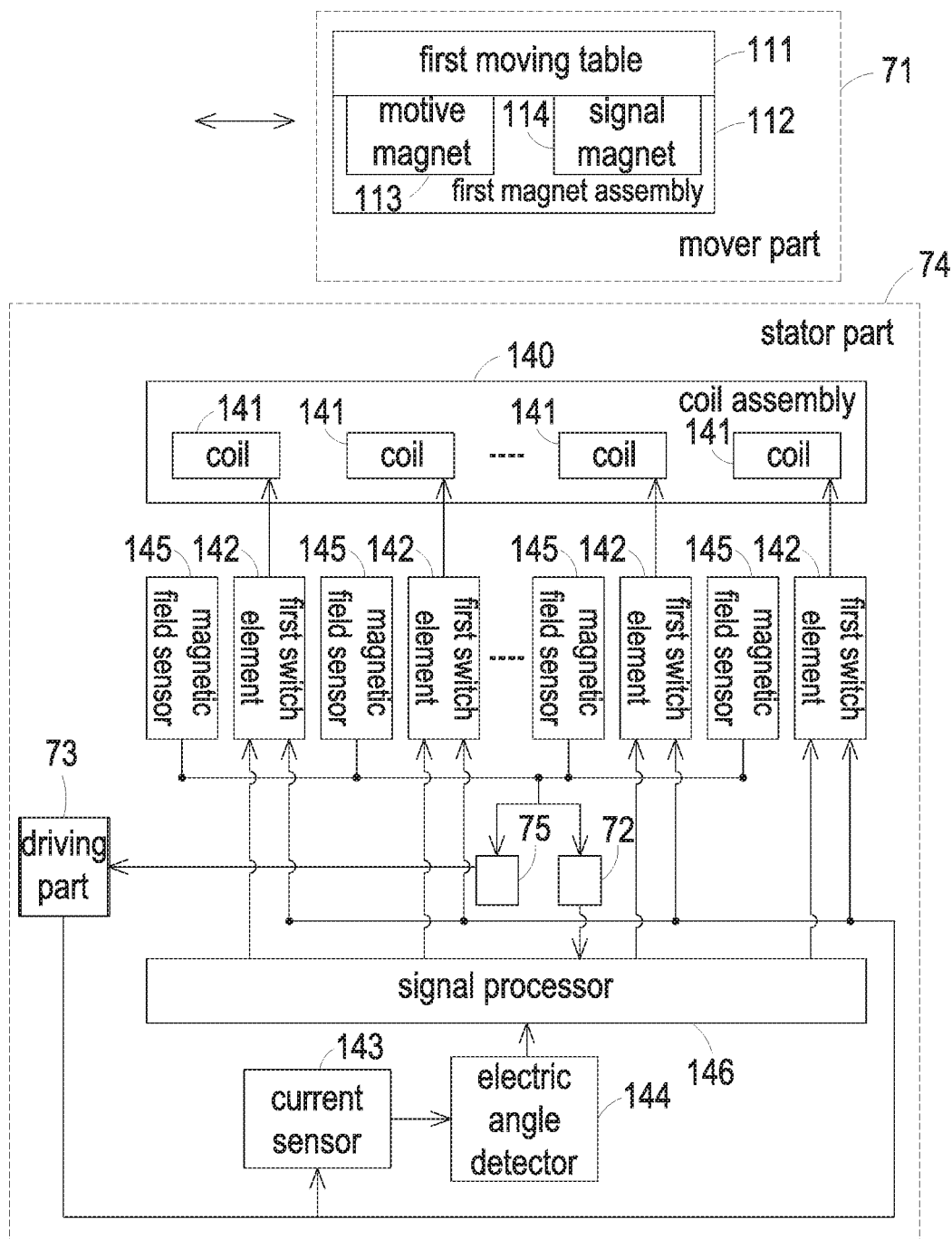
FIG. 8 is a schematic block diagram illustrating the architecture of a moving-magnet transfer platform according to a fourth embodiment of the present invention.
Figure 9:
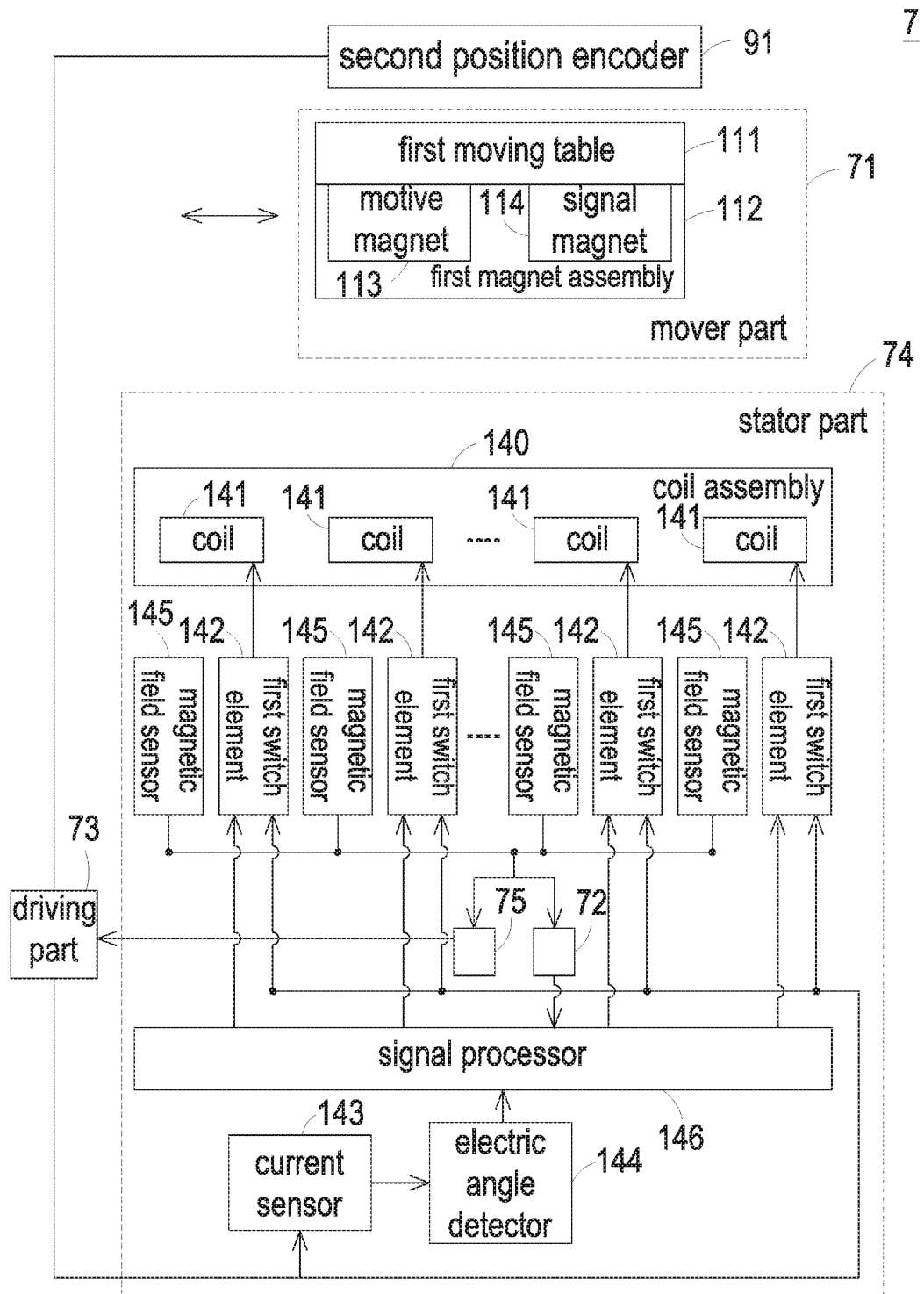
FIG. 9 is a schematic block diagram illustrating the architecture of a moving-magnet transfer platform according to a fifth embodiment of the present invention.

FIG. 8 is a schematic block diagram illustrating the architecture of a moving-magnet transfer platform according to a fourth embodiment of the present invention. In comparison with FIG. 7, the driving part 73 of the moving-magnet transfer platform of this embodiment is integrated into the stator part 74. FIG. 9 is a schematic block diagram illustrating the architecture of a moving-magnet transfer platform according to a fifth embodiment of the present invention. In comparison with FIG. 7, the moving-magnet transfer platform 7 further comprises a second position encoder 91. Consequently, the position of the mover part 71 can be detected more precisely. The second position encoder 91 is connected with the driving part 73. Moreover, the second position encoder 91 and the stator part 74 are independently and separately arranged. The second position encoder 91 is arranged beside the mover part 71. According to the position of the mover part 71, the second position encoder 91 generates a second position encoding signal to the driving part 73. According to the first position encoding signal from the first position encoder 75 and the second position encoding signal from the second position encoder 91, the actual position of the mover part 11 can be acquired more precisely. As shown in FIG. 9, the driving part 73 and the stator part 74 are independently and separately arranged.

Figure 10:
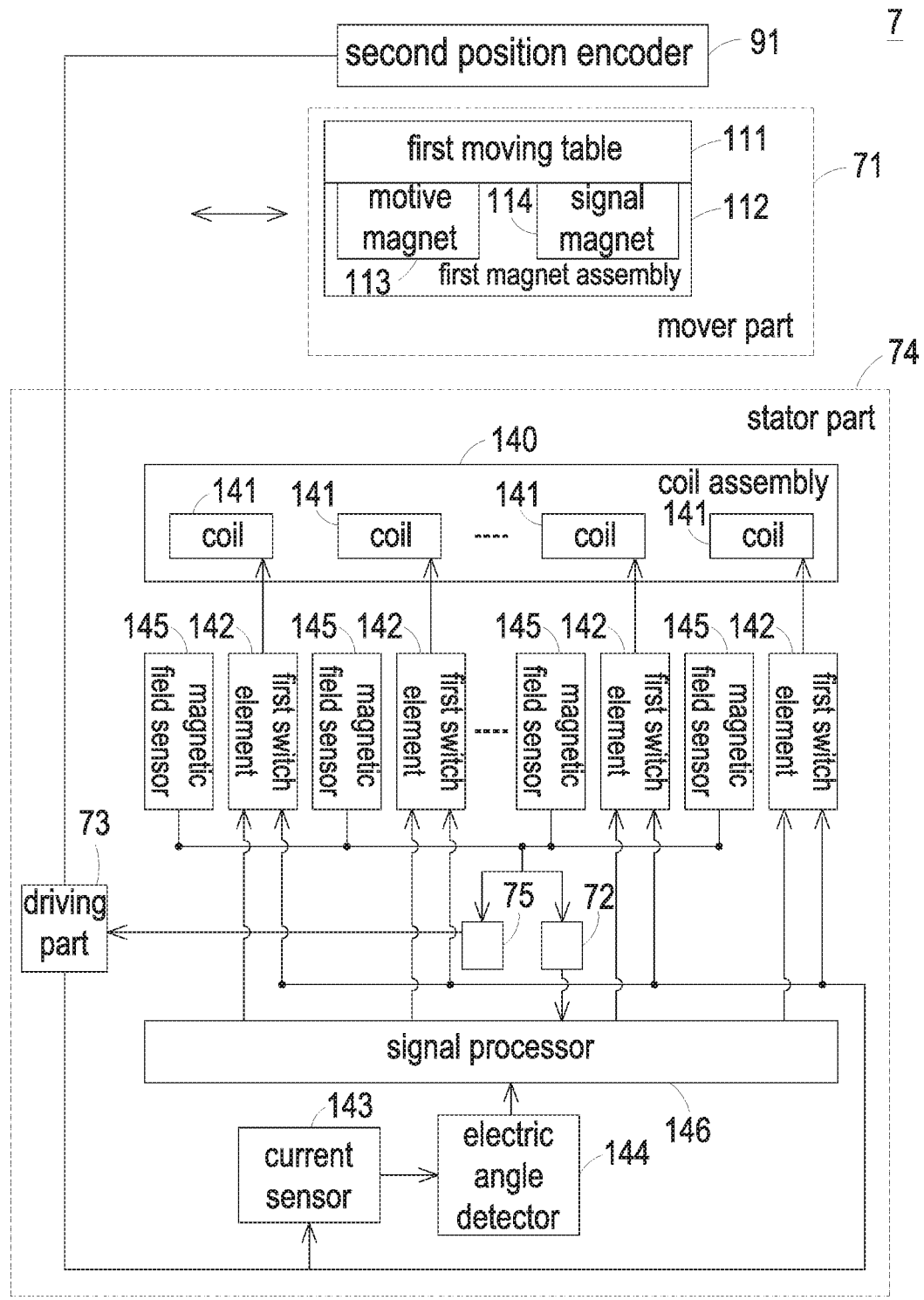
FIG. 10 is a schematic block diagram illustrating the architecture of a moving-magnet transfer platform according to a sixth embodiment of the present invention.

FIG. 10 is a schematic block diagram illustrating the architecture of a moving-magnet transfer platform according to a sixth embodiment of the present invention. In comparison with FIG. 9, the driving part 73 of the moving-magnet transfer platform of this embodiment is integrated into the stator part 74.

From the above descriptions, the present invention provides a moving-magnet transfer platform. The moving-magnet transfer platform comprises a mover part, a stator part and a driving part. In the moving-magnet transfer platform of the present invention, the first magnet assembly is the main component of the mover part, and the coil assembly is the main component of the stator part. In accordance with the conventional technology, the mover part comprises the coil assembly and the stator part comprises the magnet assembly. The heat dissipating mechanism of the moving-magnet transfer platform of the present invention is simplified, and thus the heat dissipating efficacy is enhanced. Since the coil assembly is the main component of the stator part of the moving-magnet transfer platform, it is not necessary to install a drag chain to tow and protect the power cable. Since the drag chain is omitted, the moving-magnet transfer platform of the present invention is cost-effective when compared with the conventional moving-magnet transfer platform. Moreover, the available space inside the moving-magnet transfer platform is increased. Since the stator part is fixed and immobile, the power cable is not abraded.

Moreover, the first magnet assembly is the main component of the mover part of the moving-magnet transfer platform, and the coil assembly is the main component of the stator part of the moving-magnet transfer platform. Consequently, the coil assembly is composed of more coils, and the first magnet assembly is composed of more permanent magnets. In such way, the mover part is movable relative to the stator part in a specified range. Since the material cost of the coil is much lower than the material cost of the permanent magnet, the moving-magnet transfer platform is cost-effective. Moreover, the first switch element is passively turned on or turned off according to the position of the signal magnet. Consequently, the operations of each coil of the coil assembly are correspondingly controlled. Since the operations of each coil are not actively controlled by the driving part, the circuitry of the driving part is simplified. Moreover, the uses of the current sensor and the electric angle detector can search the electric angle at the good timing of switching the first switch element. Consequently, the current fluctuation of switching the first switch element is reduced. In other words, the working status of the moving-magnet transfer platform is more stable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A moving-magnet transfer platform, comprising:
   a mover part comprising a first moving table and a first magnet assembly, wherein the first magnet assembly is disposed on the first moving table;
   a driving part generating a driving power; and
   a stator part arranged beside the mover part, and comprising:
   a coil assembly comprising plural coils, which are arranged side by side;
   plural first switch elements, each of the plural first switch elements is connected between the driving part and a corresponding one of the plural coils;
   a current sensor for detecting a driving current of the driving power and generating a current detection signal;
   an electric angle detector for detecting an electric angle of the driving current according to the current detection signal and generating an electric angle signal;
   a first magnetic field sensor assembly comprising plural first magnetic field sensors, wherein when the first magnet assembly is moved to a position of the corresponding one of the plural coils, a magnetic field change is detected by a corresponding one of the plural first magnetic field sensors; and
   a signal processor for controlling operations of the plural first switch elements according to the electric angle signal and sensing results of the plural first magnetic field sensors, wherein when the first magnet assembly is moved to the position of the corresponding one of the plural coils, a corresponding one of the plural first switch elements is turned on under control of the signal processor, and the corresponding one of the plural coils receives the driving power through the corresponding one of the plural first switch elements, so that the first moving table is moved with the first magnet assembly.

2. The moving-magnet transfer platform according to claim 1, wherein when the signal processor realizes that the first magnet assembly is moved to the position of the corresponding one of the plural coils according to a corresponding one of the sensing results of the corresponding one of the plural first magnetic field sensors and the electric angle of the driving current reaches a predetermined value according to the electric angle signal, the corresponding one of the plural first switch elements connected with the corresponding one of the plural coils corresponding to the first magnet assembly is turned on under control of the signal processor.

3. The moving-magnet transfer platform according to claim 2, wherein each of the plural coils comprises a first terminal and a second terminal, wherein the first terminal is connected with the corresponding one of the plural first switch elements, and the second terminals of the plural coils are connected with each other.

4. The moving-magnet transfer platform according to claim 2, wherein the mover part further comprises a second moving table and a second magnet assembly, wherein the second magnet assembly is disposed on the second moving table.

5. The moving-magnet transfer platform according to claim 4, wherein the moving-magnet transfer platform further comprises plural second switch elements and a second magnetic field sensor assembly, the plural second switch elements are connected between the driving part and the plural coils, and the second magnetic field sensor assembly comprises plural second magnetic field sensors, wherein when the second magnet assembly is moved to the position of the corresponding one of the plural coils, the magnetic field change is detected by a corresponding second magnetic field sensor.

6. The moving-magnet transfer platform according to claim 5, wherein the signal processor further controls operations of the plural second switch elements according to the electric angle signal and sensing results of the plural second magnetic field sensors, wherein when the signal processor realizes that the second magnet assembly is moved to the position of the corresponding one of the plural coils according to a corresponding one of the sensing results of the plural second magnetic field sensors and the electric angle of the driving current reaches the predetermined value according to the electric angle signal, each of the plural second switch elements connected with the corresponding one of the plural coils corresponding to the second magnet assembly is turned on under control of the signal processor, and the corresponding one of the plural coils receives the driving power through a corresponding one of the plural second switch elements, so that the second moving table is moved with the second magnet assembly.

7. The moving-magnet transfer platform according to claim 6, wherein each of the plural coils comprise a first terminal and a second terminal, wherein the first terminal is connected with the corresponding one of the plural first switch elements and the corresponding one of the plural second switch elements, and the second terminals of the plural coils are connected with each other.

8. The moving-magnet transfer platform according to claim 6, wherein each of the plural coils comprise a first terminal and a second terminal, wherein the first terminal is connected with the corresponding one of the plural first switch elements and the corresponding one of the plural second switch elements, the second terminal is connected with the corresponding one of the plural first switch element, and the corresponding one of the plural second switch elements, each of the plural first switch elements and each of the plural second switch elements connected with the first terminal and each of the plural first switch elements and each of the plural second switch elements connected with the second terminal are different, some of the plural first switch elements that are connected with the second terminals of the plural coils are connected with each other, and some of the plural second switch elements that are connected with the second terminals of the plural coils are connected with each other.

9. The moving-magnet transfer platform according to claim 2, further comprising a first position encoder, wherein the first position encoder is connected with the driving part, and the first position encoder provides a first position encoding signal to the driving part according to a position of the mover part.

10. The moving-magnet transfer platform according to claim 9, wherein the first magnet assembly comprises a motive magnet and a signal magnet, and the motive magnet and the signal magnet are separated from each other, wherein a magnetic field generated by the motive magnet and a magnetic field generated by the corresponding one of the plural coils in response to the driving power interact with each other, so that the first moving table is moved, wherein when the signal magnet is moved to the position of the corresponding one of the plural coils, the magnetic field change is detected by the corresponding one of the plural first magnetic field sensors.

11. The moving-magnet transfer platform according to claim 9, wherein the plural first magnetic field sensors and the plural second magnetic field sensors are digital magnetic field sensors.

12. The moving-magnet transfer platform according to claim 11, wherein the driving part and the stator part are independently and separately arranged.

13. The moving-magnet transfer platform according to claim 9, wherein the plural first magnetic field sensors are analog magnetic field sensors.

14. The moving-magnet transfer platform according to claim 13, wherein the first position encoder is integrated into the stator part and connected between the plural first magnetic field sensors and the driving part, wherein the first position encoder realizes the position of the mover part according to the sensing results of the plural first magnetic field sensors and provides the first position encoding signal to the driving part according to the position of the mover part.

15. The moving-magnet transfer platform according to claim 14, wherein the stator part further comprises an analog-to-digital converter, and the analog-to-digital converter is connected between the plural first magnetic field sensors and the signal processor, wherein the sensing results of the plural first magnetic field sensors in an analog form are converted into digital sensing results by the analog-to-digital converter, and the digital sensing results are provided to the signal processor.

16. The moving-magnet transfer platform according to claim 15, wherein the driving part and the stator part are independently and separately arranged.

17. The moving-magnet transfer platform according to claim 15, wherein the driving part is integrated into the stator part.

18. The moving-magnet transfer platform according to claim 15, further comprising a second position encoder, wherein the second position encoder is connected with the driving part, and the second position encoder and the stator part are independently and separately arranged, wherein the second position encoder generates a second position encoding signal to the driving part according to the position of the mover part.

19. The moving-magnet transfer platform according to claim 2, wherein the predetermined value of the electric angle signal is 0 degree or 180 degree.

20. The moving-magnet transfer platform according to claim 2, wherein the plural first magnetic field sensors are separated from each other, and every two adjacent magnetic field sensors are separated from each other by a 120-degree electric angle.

* * * * *